US006339131B1

(12) United States Patent
Cella et al.

(10) Patent No.: US 6,339,131 B1
(45) Date of Patent: Jan. 15, 2002

(54) SYNTHESIS OF POLY (ARYLENE ETHER)-POLY(ORGANOSILOXANE) COPOLYMERS

(75) Inventors: James A. Cella, Clifton Park, NY (US); Juraj Liska, Bergen op Zoom (NL); Victoria L. Ulery, Hattiesburg, MS (US); Gary W. Yeager, Schenectady, NY (US); Susan Adams Nye, Feura Bush, NY (US); Hua Guo, Delmar, NY (US); Navjot Singh, Clifton Park, NY (US)

(73) Assignee: General Electric Company, Pittsfield, MA (US)

( * ) Notice: Subject to any disclaimer, the term of this patent is extended or adjusted under 35 U.S.C. 154(b) by 0 days.

(21) Appl. No.: 09/455,070

(22) Filed: Dec. 6, 1999

(51) Int. Cl.$^7$ .............................................. C08F 283/12
(52) U.S. Cl. ......................... 525/474; 528/25; 528/26; 528/27; 528/28
(58) Field of Search .................... 525/474; 528/25, 528/26, 28, 27

(56) References Cited

U.S. PATENT DOCUMENTS

| 3,306,874 A | | 2/1967 | Hay |
| 3,306,875 A | | 2/1967 | Hay |
| 3,668,273 A | * | 6/1972 | Krantz .................. 260/824 R |
| 3,696,137 A | | 10/1972 | Clark et al. |
| 3,733,299 A | | 5/1973 | Cooper et al. |

(List continued on next page.)

FOREIGN PATENT DOCUMENTS

| DE | 4 436 675 A1 | 4/1995 |
| JP | 5078470 | 3/1993 |
| JP | 5306366 | 11/1993 |

OTHER PUBLICATIONS

Macromolecules, vol. 28, No. 23,"Functional Oligomers, Telechelics, and Graft and Star Shaped poly(2,6–dimethyl–1,4–phenylene ether)s Prepared by Redistribution ", Nov. 6, 1995, pp. 7967–7969.
The Journal of Organic Chemistry, "The Synthesis of 4–Hydroxyarylene Ethers by the Equilibration of Phenols with Poly(2,6–dimethyl–1,4–phenylene ether)", D. White, vol. 34, No. 2, pp. 297–303, Feb. 1969.
A.J. Chalk, "Direct Metalation of Poly(2,6–dimethyl–1, 4–phenylene ether)", Journal of Polymer Science, Part A–1, vol. 7, pp. 691–705 (1969).
D. White, "Polymerization of Oxidative Coupling. II. Co–Redistribution of Poly(2,6–diphenyl–1,4–phenylene ether) with Phenols", Journal of Polymer Science, Part A–1, vol. 9, pp. 663–675 (1971).
R. D. Allen et al., "Sythesis and Properties of Xylenyl Ether–Dimethylsiloxane Triblock Polymers", POLYMER BULLETIN, vol. 19, pp. 130–110, 1988.

Primary Examiner—Margaret G. Moore

(57) ABSTRACT

A method comprising
(a) synthesis of a poly(arylene ether) having the structure (1)

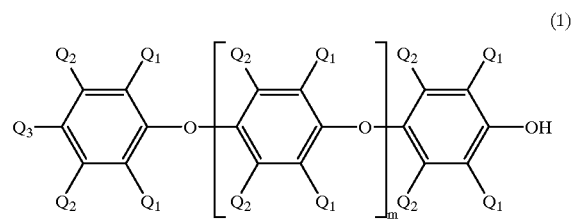

(1)

wherein m is an integer having an average value in the range from about 3 to about 300;

(b) solution functionalization of polymer (1) to form functionalized poly(arylene ether) having the structure (2)

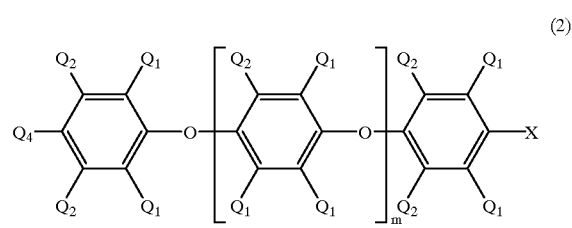

(2)

wherein X is a reactive functional group selected from the group consisting of anhydride, hydroxyl, epoxy, carboxyl, —R$^1$OH, R$^1$CO$_2$R$^2$, —R$^1$CH$_2$=CH$_2$, or vinyl, wherein R$^1$ is a primary or secondary divalent alkyl or haloalky group having from 1 to 20 carbons, or an aryl group and R$^2$ is a primary or secondary alkyl group having from 1 to 10 carbons; and Q$_4$ is hydrogen, X, or a mixture thereof;

(c) reaction of functionalized poly(arylene ether) (2) with a poly(organosiloxane) having structure (3):

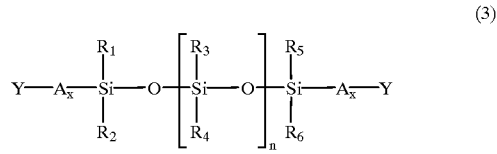

(3)

wherein x is zero or one and Y is a functional group reactive with X, selected from the group consisting of —OH, —CH$_2$=CH$_2$, epoxy, amino, carboxy, —C(O)CH$_2$OH, or hydrogen, to form a poly(arylene ether)-poly(siloxane) copolymer, wherein the functionalization is in solution, and copolymer synthesis and isolation are effected by first solution and then melt copolymerization.

25 Claims, No Drawings

U.S. PATENT DOCUMENTS

| | | |
|---|---|---|
| 3,914,266 A | 10/1975 | Hay |
| 4,028,341 A | 6/1977 | Hay |
| 4,547,480 A | 10/1985 | Bennett, Jr. et al. ........ 502/159 |
| 4,642,358 A | 2/1987 | Aycock et al. |
| 4,665,137 A | 5/1987 | Percec |
| 4,746,708 A | 5/1988 | Sybert |
| 4,814,392 A * | 3/1989 | Shea et al. .................. 525/391 |
| 4,871,816 A * | 10/1989 | Percec et al. ............... 525/393 |
| 4,888,397 A | 12/1989 | Van Der Meer et al. |
| 4,994,531 A | 2/1991 | Brown et al. |
| 5,096,979 A | 3/1992 | Brown et al. |
| 5,128,421 A | 7/1992 | Ohmura et al. |
| 5,204,438 A | 4/1993 | Snow et al. |
| 5,281,686 A | 1/1994 | Blohm et al. |
| 5,357,022 A | 10/1994 | Banach et al. |
| 5,372,765 A | 12/1994 | Chen et al. |
| 5,385,984 A * | 1/1995 | Blohm et al. ................ 525/393 |

\* cited by examiner

SYNTHESIS OF POLY (ARYLENE ETHER)-POLY(ORGANOSILOXANE) COPOLYMERS

BACKGROUND OF THE INVENTION

The present invention is directed to poly(arylene ether) copolymers, and in particular to poly(phenylene ether)-poly(organosiloxane) copolymers and methods for the synthesis thereof.

Poly(arylene) ethers, and in particular poly(2,6-dimethyl-1,4-phenylene) oxide, are engineering thermoplastics characterized by excellent hydrolytic stability, dimensional stability, and dielectric properties. Poly(arylene) ethers also possess high glass transition temperatures, on the order of greater than 200° C., and high melt viscosity. Because of their high melt viscosity poly(arylene) ethers require high melt processing temperatures, which can lead to undesirable side-reactions such as degradation. Poly(arylene) ethers can also be brittle, and so are often blended with other polymers and copolymers.

Attempts to prepare blends, composites or copolymers of poly(arylene) ethers with poly(organosiloxane) polymers presents difficulties based on the extreme incompatibility of the poly(arylene) ether and poly(organosiloxane). Of these, methods for the preparation of copolymers of poly(arylene) ethers with poly(organosiloxane)s have been extensively investigated. A number of routes rely on activation of either the poly(arylene) ether or the poly(siloxane) moiety. For example, lithiation of a poly(arylene) ether followed by reaction with a chloro-terminated poly(organosiloxane) in solution leads to graft copolymers, as disclosed in JP 61,2525,214 to Matsui et al. This approach is prohibitively expensive for industrial production based on the costs of lithium reagents and the extremely pure conditions required for any solution lithiation process. Shea et al., in U.S. Pat. No. 4,814,392 report copolymer synthesis by reaction of anhydride-activated poly(arylene) ethers with an amino terminated poly(organosiloxane) in melt and in solution. The resulting copolymers are joined by either amide or imide linkages. Reaction of a hydroxy-terminated poly(arylene) ether with an amino-terminated poly(organosiloxane) is disclosed in U.S. Pat. No. 3,668,273 to Kranz et al. and U.S. Pat. No. 3,696,137 to Clark et al.

A reactive extrusion process has been used for preparation of poly(arylene) ether-poly(siloxane) copolymers from epoxy-, carboxy- or amino-functionalized poly(arylene) ethers with epoxy-, carboxy- or amino-functionalized poly(siloxane)s, in U.S. Pat. No. 5,385,984 to Blohm et al. Preparation of tri-block copolymers of poly(arylene ether)-poly(dimethylsiloxane)-poly(arylene ether) is disclosed by R. D. Allen and J. L. Hendrick, in Polym. Bull. Vol. 19, pp. 101–110 (1988). The copolymers were prepared based on phenolic hydroxyl-silylamine condensation via reaction of tertiary amino-stopped polydimethylsiloxane (PDMS) with the phenolic end groups of poly(arylene ether). These polymers are described as useful as additives for polystyrene-based materials.

Alternatively, U.S. Pat. No. 5,204,438 to Snow et al. and U.S. Pat. No. 5,281,686 to Blohm et al. disclose poly(arylene ether)-poly(organosiloxane) copolymers produced by incorporation of a silicon-containing phenol or bisphenol into a poly(arylene ether) chain by oxidative copolymerization with 2,6-xylenol. Graft co-polymers having up to about 20 mol % of poly(siloxane) may be prepared by this method. U.S. Pat. No. 5,357,022 to Banach et al. discloses formation of block copolymers by copolymerization of 2,6-xylenol with a phenol-stopped poly(siloxane) macromer. The macromer was prepared by hydrosilylation of an allylphenol derivative (e.g., eugenol, 2-methoxy-4-allyl-phenol) with dihydride-stopped polysiloxanes.

While suitable for their intended purposes, none of the preceding processes is cost-effective or suitable for industrial-scale preparation of poly(arylene ether)-poly(organosiloxane) copolymers. They use expensive reactants and/or preparation procedures, and the intermediates continue to exhibit thermal instability during processing. Accordingly, there remains a need in the art for methods for the industrially-feasible manufacture of poly(arylene ether)-poly(organosiloxane)copolymers having favorable processing characteristics, and which can be used as engineering thermoplastics, or which can be blended with poly(arylene) ethers or thermoset or rubber formulations to improve processing and other desirable properties such as flame retardancy and/or low smoke generation during burning.

SUMMARY OF THE INVENTION

The above-mentioned drawbacks and disadvantages are alleviated by a method for the synthesis of synthesis of poly(arylene ether)-poly(siloxane) copolymers, comprising (a) synthesis of a poly(arylene ether) having the structure (1)

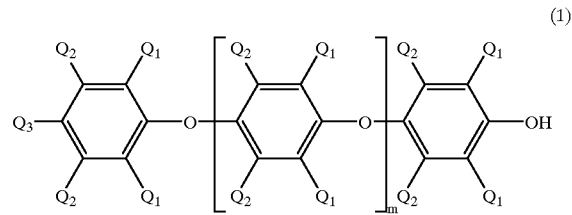

wherein each $Q_1$ is independently hydrogen, a primary or secondary alkyl group having from 1 to about 7 carbon atoms, phenyl, haloalkyl, aminoalkyl, hydrocarbonoxy, or halohydrocarbonoxy wherein at least two carbon atoms separate the halogen and oxygen atoms; each $Q_2$ is independently hydrogen, halogen, a primary or secondary alkyl group having from 1 to about 7 carbon atoms, phenyl, haloalkyl, aminoalkyl, hydrocarbonoxy, or halohydrocarbonoxy wherein at least two carbon atoms separate the halogen and oxygen atoms; $Q_3$ is a hydrogen, a hydroxyl group, or a mixture thereof; and m is an integer having an average value in the range from about 3 to about 300;

(b) solution functionalization of polymer (1) to form functionalized poly(arylene ether) having the structure (2)

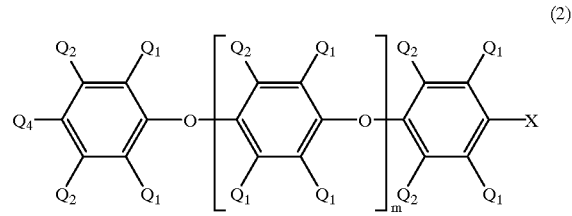

wherein $Q_1$, $Q_2$, and m are as defined above; X is a reactive functional group selected from the group consisting of anhydride, hydroxyl, epoxy, carboxyl, —$R^1$OH, $R^1CO_2R^2$, —$R^1CH_2$=$CH_2$, or vinyl, wherein $R^1$ is a primary or secondary divalent alkyl or haloalkyl group having from 1 to 20 carbons, or an aryl group and $R^2$ is a primary or secondary alkyl group having from 1 to 10 carbons; and $Q4$ is hydrogen, X, or a mixture thereof;

(c) reaction of functionalized poly(arylene ether) (2) with a poly(organosiloxane) having structure (3):

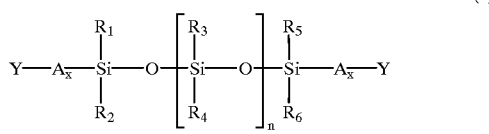

(3)

wherein each R is independently a primary or secondary alkyl group having from one to 12 carbons, a primary or secondary haloalkyl group having from one to twelve carbons, an aryl group having from 6 to 12 carbons, an aralkyl group having from 7 to 18 carbons, or mixtures thereof; n is an integer having an average value from about 3 to about 500 inclusive; and A is a substituted or unsubstituted aromatic group having from 6 to about 18 carbon atoms, or a primary or secondary divalent saturated or unsaturated alkyl group having from 1 to about 30 carbon atoms; x is zero or one; and Y is a functional group reactive with X, selected from the group consisting of —OH, —$CH_2$=$CH_2$, epoxy, amino, carboxy, —C(O)$CH_2$OH, or hydrogen, to form a poly(arylene ether)-poly(siloxane) copolymer; and (d) isolation of the product poly(arylene ether)-poly(siloxane) copolymer, wherein the functionalization is in solution, and copolymer synthesis and isolation are effected by first solution and then melt copolymerization.

A further embodiment comprises a poly(arylene ether)-poly(siloxane) copolymer synthesized from a functionalized poly(arylene ether) wherein $Q_1$, $Q_2$, $Q_4$, and X may be oriented in any of the available substitution positions on the aryl groups as generically indicated by structure (4):

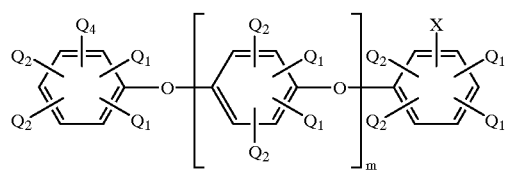

(4)

wherein $Q_1$, $Q_2$, $Q_4$ X, and m are as defined above.

Another embodiment comprises a poly(arylene ether)-poly(siloxane) copolymer synthesized from a functionalized poly(arylene ether) (2) wherein $Q^1$, $Q^2$, and m are as defined above, and X is a reactive functional group selected from the group consisting of —$R^1$OH, $R^1CO_2R^2$, —$R^1CH_2$=$CH_2$ or vinyl, wherein $R^1$ is a primary or secondary divalent alkyl or haloalkyl group having from 1 to 20 carbons, an aryl group and $R^2$ is a primary or secondary alkyl group having from 1 to 10 carbons; and a poly(organosiloxane) having the structure (2) wherein each of R, A, and x is as defined above, and Y is —OH or —C(O)$CH_2$OH when X is —$R^1$OH or $R^1CO_2R^2$; Y is vinyl or allyl when X is vinyl or allyl; or Y is H and x is 0 when X is —$R^1CH_2$=$CH_2$ or vinyl. When Y is —OH or —C(O)$CH_2$OH and X is —$R^1$OH or $R^1CO_2R^2$, reaction is conducted in the presence of a co-reactant selected from the group consisting of a dianhydride, diepoxide or dialkylcarbonate. When Y is vinyl or allyl and X is vinyl or allyl, reaction is initiated using heat or a free radical initiator. When Y is H and X is allyl or vinyl, copolymerization is conducted in the presence of a catalyst such as platinum.

The poly(arylene ether)-poly(siloxane) copolymers are useful as molding materials, as as treating agents for fillers such as fumed silica, quartz, or clays, or as sizing agents for glass, to promote compatibility between the polar surfaces of the filler and matrix. For example, fumed silica treated with poly(arylene ether)-poly(siloxane) copolymers are extremely useful for the manufacture of environmentally friendly tires, as the poly(arylene ether) portion of the copolymer is compatible with the styrene-butadiene rubber portion of the tire, while the poly(siloxane) portion of the copolymer has a very high affinity to the filler. The poly(arylene ether)-poly(siloxane) copolymers are also useful as additives to other thermoplastic or elastomeric resins. For example, linear poly(phenylene ether)-polyorganosiloxane copolymers in particular have use as impact modifiers or flame retardants for thermoplastic blends.

DETAILED DESCRIPTION OF THE PREFERRED EMBODIMENTS

A method for synthesis of poly(arylene ether)-poly(siloxane) copolymers comprises reaction of a poly(arylene ether) having at least one functional group selected from the group consisting of anhydride, hydroxyl, epoxy, carboxyl, —$R^1$OH, $R^1CO_2R^2$, —$R^1CH_2$=$CH_2$, allyl, or vinyl, wherein $R^1$ is a primary or secondary divalent alkyl or haloalkyl group having from 1 to about 20 carbons, or an aryl group and $R^2$ is a primary or secondary alkyl group having from 1 to about 10 carbons, with a poly(siloxane) have at least two functional groups reactive with the functional groups of the poly(arylene ether), the reactive groups of the poly(siloxane being selected from the group consisting of —OH, —$CH_2$=$CH_2$, epoxy, amino, carboxy, —C(O)$CH_2$OH, and hydrogen. Preferably, the method comprises (1) solution synthesis of a poly(arylene ether) having structure (1):

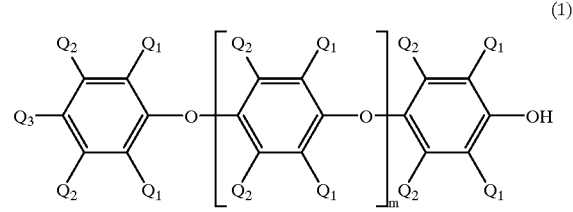

(1)

(2) solution functionalization of poly(arylene ether) (1) to form functionalized poly(arylene ether) having the structure (2);

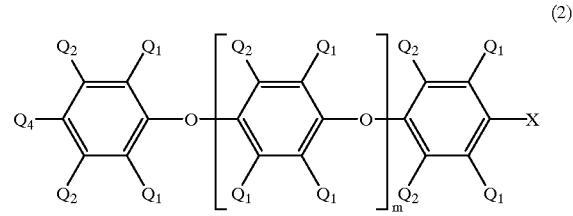

(2)

(3) reaction of functionalized poly(arylene ether) (2) with a poly(organosiloxane) having structure (3):

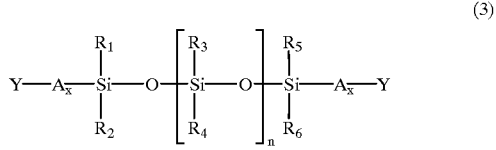

(3)

to form a poly(arylene ether)-poly(siloxane) copolymer; and (4) isolation of the product poly(arylene ether)-poly (siloxane) copolymer, in a continuous process. In a particularly preferred embodiment, functionalization, copolymer synthesis, and isolation (steps 2, 3, and 4) are a continuous process effected by solution functionalization, solution co-polymerization, and devolatilization extrusion co-polymerization and isolation.

The first step, synthesis of poly(arylene ether)s (also known as polyphenylene ethers or polyphenylene oxides), is known, being described for example in U.S. Pat. Nos. 3,306,874 and 3,306,875, and 3,733,299, which are incorporated herein by reference. Preferred poly(arylene ethers) have the general structure (1) wherein each $Q_1$ is independently halogen, a primary or secondary alkyl group having from 1 to about 7 carbon atoms, phenyl, haloalkyl, aminoalkyl, hydrocarbonoxy, or halohydrocarbonoxy wherein at least two carbon atoms separate the halogen and oxygen atoms; each $Q_2$ is independently hydrogen, halogen, a primary or secondary lower alkyl group having from 1 to about 7 carbon atoms, phenyl, haloalkyl, aminoalkyl, hydrocarbonoxy, or halohydrocarbonoxy wherein at least two carbon atoms separate the halogen and oxygen atoms; and m is an integer having an average value in the range from about 3 to about 300. Exemplary lower alkyl groups include, but are not limited to, methyl, ethyl, n-propyl, n-butyl, n-amyl, isoamyl, 2-methylbutyl, n-hexyl, 2,3-dimethylbutyl, 2-, 3-, or 4-methylpentyl and the corresponding heptyl groups; isopropyl, sec-butyl, and 3-pentyl. Preferably, $Q_1$ is a primary alkyl radical having from 1 to about 4 carbon atoms, or phenyl. Most preferably, $Q_1$ is methyl and $Q_2$ is hydrogen.

$Q_3$ in structure (1) is preferably a hydrogen, a hydroxyl, or a mixture thereof. As is well known by those of ordinary skill in the art, poly(phenylene ether)s having the general structure (1) generally comprise a mixtures of compounds, including both monohydroxyl and dihydroxyl-terminated polymers. Accordingly, a further embodiment uses a poly (arylene ether) wherein $Q_1$, $Q_2$, $Q_3$, and the hydroxyl groups may be oriented in any of the available substitution positions on the aryl groups as generically indicated by structure (5):

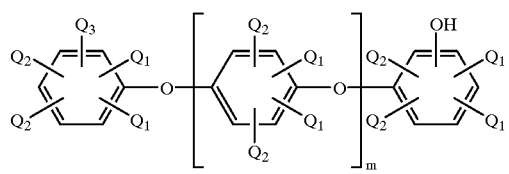

(5)

wherein $Q_1$, $Q_2$, $Q_3$, and m are as defined above.

The ratio of monohydroxyl and dihydroxyl terminated polymers in structures (4) and (5) may be adjusted by variation in the reaction conditions by known methods, for example adjustment of the relative quantity of catalyst present during formation, e.g., TMDQ, wherein higher quantities of TMDQ result in higher relative quantities of dihydroxyl-terminated polymers. The particular molar ratio of monohydroxyl-terminated polymers to dihydroxyl-terminated polymers may be anywhere in the range of about 1:99 to about 95:5, preferably in the range of about 1:99 to about 50:50, more preferably in the range of about 1:99 to about 25:75, even more preferably in the range from about 1:99 to about 10:90.

Preferably, m has a value in the range from about 15 to about 200 or m is such that the poly(arylene ether)s generally have a number average molecular weight within the range of about 2,000–25,000 g/mol, preferably from about 2,000 to about 12,000, and a weight average molecular weight within the range of about 6,000–80,000, preferably from about 6,000 to about 60,000 as determined by gel permeation chromatography (GPC). Since many poly (siloxane)s degrade at the normal processing temperatures of poly(arylene ether)s (about 300° C. or greater), preferred poly(arylene ether)s have a lower molecular weight and thus lower glass transition temperatures (less than about 200° C.) to allow as low processing temperatures as possible (preferably below about 300° C., and most preferably below about 250° C.).

Both homopolymer and copolymer poly(arylene ether)s are included. The preferred homopolymers are those containing, for example, 2,6-dimethylphenylene ether units. Suitable copolymers include random copolymers containing, for example, such units in combination with 2,3,6-trimethyl-1,4-phenylene ether units or copolymers derived from copolymerization of 2,6-dimethylphenol with 2,3,6-trimethylphenol. Also included are poly(arylene ether)s containing moieties prepared by grafting vinyl monomers or polymers such as polystyrenes, as well as coupled poly(arylene ether)s in which coupling agents such as low molecular weight polycarbonates, quinones, heterocycles and formals undergo known reactions with the hydroxy groups of two poly(arylene ether) chains to produce a higher molecular weight polymer. Useful poly(arylene ether)s further include combinations of any of the above.

Poly(arylene ether)s are typically prepared by oxidative coupling of at least one corresponding monohydroxyaromatic compound. Particularly useful and readily available monohydroxyaromatic compounds are 2,6-xylenol (wherein each $Q_1$ is methyl and each $Q_2$ is hydrogen), whereupon the polymer may characterized as poly(2,6-dimethyl-1,4-phenylene ether), and 2,3,6-trimethylphenol (wherein each $Q_1$ and one $Q_2$ is methyl and the other $Q_2$ is hydrogen). A variety of catalyst systems are known, generally containing at least one heavy metal compound such as copper, manganese or cobalt compound, usually in combination with various other materials. Preferred catalysts systems comprising copper compounds (e.g., cuprous or cupric ions, halide ions, and at least one amine) are described in U.S. Pat. Nos. 3,306,874, 3,306,875, 3,914,266, and 4,028,341, which are incorporated by reference herein. Manganese compounds are generally used in alkaline systems in which divalent manganese is present as complexes with one or more complexing and/or chelating agents such as dialkylamines, 0-hydroxyaromatic aldehydes, o-hydroxyazo compounds, and gamma-hydroxyimines.

Poly(arylene ether)s (1) (or (5) are then functionalized, preferably in solution, to form functionalized poly(arylene ether)s (2) or (4), respectively, wherein $Q_1$, $Q_2$, $Q_4$, and m are as defined above. X is one of a number of reactive functional groups, selected from the group consisting of anhydride, hydroxyl, epoxy, carboxyl, —$R^1OH$, $R^1CO_2R^2$, —R$^1$CH$_2$=CH$_2$, allyl, or vinyl, wherein R$^1$ is a primary or secondary divalent alkyl or haloalkyl group having from 1 to about 20 carbons, or an aryl group and R$^2$ is a substituted or unsubstituted primary or secondary alkyl group having from 1 to about 10 carbons. Again, preferred functionalized poly(arylene ether)s (2) have a lower glass transition temperature (less than about 200° C.) to allow as a low processing temperature as possible (preferably below about 300° C., and most preferably below about 250° C.).

Functionalization is generally carried out by solution or co-extrusion methods. Methods for synthesis of a functionalized poly(arylene ether) (2) wherein X is anhydride, hydroxyl, epoxy, carboxyl, and allyl are known.

Reaction of poly(arylene ether) (1) with a compound having an acyl functional group yields a poly(arylene ether) (2) wherein X is an anhydride, for example, trimellitic anhydride acid as disclosed in U.S. Pat. No. 4,642,358, or maleic anhydride, as disclosed in U.S. Pat. No. 4,814,392, both of which are incorporated by reference herein.

Reaction of poly(arylene ether) (1) with a polymerizable epoxy-containing olefinic compound in the presence of a free radical initiator yields poly(arylene ether) (2) wherein X is an epoxy group. Epoxy- functionalized poly(arylene ether)s are disclosed in Brown et al., U.S. Pat. No. 4,9994, 531, which is incorporated herein by reference. Epoxy-triazene capped poly(arylene) ethers are prepared by the reaction of a polyarylene ether and an epoxychlorotriazine, such as a diglycidyl chorocyanurate, as disclosed in U.S. Pat. No. 5,096,979, which is incorporated herein by reference.

Carboxy-functionalized poly(arylene ether)s are shown by Chalk et al. in J. Polymer Sci. Part A-1, Vol. 7, 691–705 (1969) and U.S. Pat. No. 4,646,708, both of which are incorporated by reference herein.

A preferred embodiment comprises functionalized poly (arylene ether)s (2) wherein X is a reactive functional group selected from the group consisting of —R$^1$OH, R$^1$CO$_2$R$^2$, —R$^1$CH$_2$=CH$_2$, or vinyl, wherein R$^1$is a primary or secondary divalent alkyl or haloalkyl group having from 1 to about 20 carbons, an aryl group and R$^2$ is a primary or secondary alkyl group having from 1 to about 10 carbons.

Reaction of poly(arylene ether) (1) with glycidol yields poly(arylene ether) (2) wherein X is R$^1$OH, as disclosed in U.S. Pat. No. 5,128,421 or hydroxyalkylation of poly (arylene ether) as described in U.S. Pat. No. 4,746,708.

Reaction of poly(arylene ether) (1) with fictionalizing compound having at least one carbon-carbon double or triple bond and at least one ester group yields poly(arylene ether) (2) wherein X is R$^1$CO$_2$R$^2$, as disclosed in U.S. Pat. No. 4,888,397.

Reaction of poly(arylene ether) (1) an allylic halide under basic conditions yields poly(arylene ether) (2) wherein X allyl. Other methods for synthesis of poly(arylene ether)s (2) wherein X is allyl are disclosed in JP No's. 5,078,470 or 5,306,366.

Reaction of poly(arylene ether) (1) with vinylbenzyl containing compounds yields poly(arylene ether) (2) wherein X is vinyl, as disclosed in U.S. Pat. No. 4,665,137.

Of the several synthetic methods used for poly(arylene ether) functionalization, poly(arylene ether) redistribution with functionalized phenolics is preferred, as disclosed by D. M. White, in Journal of Organic Chemistry, Vol. 34, p. 297 (1969) and in Journal of Polym. Science, Part A, Vol. 9, p. 663 (1971); and by H. A. M. van Aert, in Macromolecules, Vol. 28, 7967 (1995). Redistribution typically occurs between a poly(arylene ether) and a functionalized phenol in an inert solvent, for example chloroform, toluene, or the like, in the presence of an oxidizing agent such as a copper salt (for example copper nitrate trihydrate complex with N-methyl imidazole), a peroxide (for example benzoyl peroxide), or a quinone [for example 3,3', 5,5'-tetramethyl4, 4'-diphenquinone (TMDQ)]. Redistribution may be used to form poly(arylene ether)s wherein X is —COOH, vinyl, hydroxyalkyl, hydroxyaryl, or ester as, for instance, described in the U.S. Pat. No. 5,880,221.

After functionalization, the next step requires reaction of functionalized poly(arylene ether) (2) with a poly (organosiloxane) having structure (3):

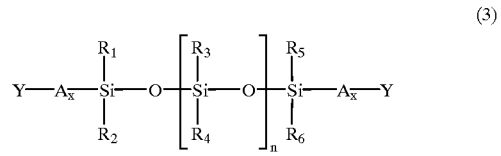

wherein each R is independently a primary or secondary alkyl group having from one to 12 carbons, a primary or secondary haloalkyl group having from one to twelve carbons, an aryl group having from 6 to 12 carbons, an aralkyl group having from 7 to 18 carbons, or mixtures thereof. Preferably, R is methyl. Preferably, n is an integer having an average value from about 1 to about 1,000,000 inclusive, more preferably n is an integer having an average value in the range from about 1 to about 100,000 inclusive and most preferably, n is an integer having an average value in the range from about 3 to about 500 inclusive.

In the above formula (3), A is a substituted or unsubstituted aromatic group having from 6 to about 18 carbon atoms, or a primary or secondary divalent saturated or unsaturated alkyl group having from 1 to about 30 carbon atoms; x is zero or one; and Y is a functional group reactive with X, selected from the group consisting of —OH, —CH$_2$=CH$_2$, epoxy, amino, carboxy, —C(O)CH$_2$OH, or, when x is zero, hydrogen. Reaction of (2) with (3) forms a poly(arylene ether)-poly(siloxane) copolymer. The amount of poly(siloxane) (3) used for copolymerization is in the range from about 1 to about 80, preferably from about 5 to about 50, and most preferably from about 10 to about 30 mole percent based on the amount of poly(arylene ether) monomer units. Use of more than about 5 percent by weight of poly(siloxane) results in lubrication of the screw during extrusion, which can adversely affect the extrusion and/or molding process. This difficulty is reduced by performing the copolymerization in solution and, for instance, a CSTR type of reactor.

Various initiators may be used to facilitate copolymerization. For example, tertiary amines such as imidazoles, quaternary onium salts such as tetramethylammonium chloride, or mineral acids such as hydrochloric acid may be present for catalysis of the reaction of a carboxy-modified poly (arylene ether) (2) wherein X is —COOH, with an epoxy-modified poly(siloxane) (2) wherein Y is an epoxy group.

One preferred siloxane (3) has X substituted by the reactive functional groups —OH, —C(O)CH$_2$OH, or —OH wherein x 1 and A is a substituted or unsubstituted alkyl or aryl group, when X is —OH or —CO$_2$R$^2$. In these instances, reaction is conducted in the presence of a co-reactant selected from the group consisting of a dianhydride, for example 1,2,4,5-tetracarboxylic anhydride benzene, a diepoxide, for example a diglycidyl ether of bisphenol A, or a dialkylcarbonate, for example dibutylcarbonate. Where significant differences in reactivity exists, reaction is conducted stepwise, e.g., a diaryl carbonate may first be reacted with a hydroxyalky-substituted poly(siloxane), followed by reaction of the formed intermediate with a hydroxy-stopped poly(arylene ether). Alternatively, a hydroxy-stopped polyarylene ether) may first be reacted with a hydroxyalkyl-substituted poly(siloxane), followed by reaction of the formed intermediate with a hydroxy-stopped poly(siloxane). Various esterification catalysts suitable for use in these reactions are known in the art, and include, for example ammonium salts such as tetraalkyl ammonium halides or phosphonium salts such as tetraalkylphosphonium halides.

Another preferred siloxane (3) is substituted by the reactive functional groups vinyl or allyl when X is hydroxy, vinyl or allyl. Copolymerization is initiated using heat or a free radical initiator, for example peroxides such as dicumylperoxide. Grafting may occur on poly(arylene ether) methyl groups and/or irregular units composed of bonds sensitive to a radical reaction (particularly where X is hydroxy). Grafting to vinyl-poly(siloxane)s can be further facilitated by using poly(arylene ether) functionalized with an unsaturated bond such as vinyl or allyl group.

Still another preferred siloxane (3) is a hydrido-substituted siloxane wherein Y is hydrogen and x is 0 when X is $-R^1CH_2=CH_2$ or vinyl. Other polyorganosiloxanes having at least two Si—H groups are also useful. Copolymerization can be conducted in the presence of a catalyst such as platinum or palladium.

The above-described steps of poly(arylene ether) synthesis, functionalization, and copolymerization may occur in solution, in the melt, or a combination thereof Prior art processes have generally required isolation of each intermediate after each step. Various isolation techniques are available for the separation of poly(arylene ether)s, their functionalized derivatives, and their copolymers after synthesis. In a preferred embodiment, synthesis, functionalization, copolymer formation and the product isolation steps occur via an in-line process without isolation of the intermediates.

Accordingly, after the poly(arylene ether) solution synthesis step(s), the resulting poly(arylene ether) solution is transferred to a modification vessel where solution functionalization and solution copolymer formation occurs sequentially. The solution containing the copolymer is then treated to effect isolation of the copolymer. The final isolation of the poly(arylene ether)-poly(siloxane) copolymer is preferably carried out in a devolatilizing extruder although other methods involving precipitation, spray drying, wiped film evaporators, flake evaporators, and flash vessels with melt pumps, including various combinations involving these methods are also useful and in some instances preferred. In these techniques it is highly preferred that catalysts (e.g., metal catalysts) removal be completed in the prior process steps as any catalyst remaining in solution will necessarily be isolated in the poly(arylene ether)-poly(siloxane) copolymers.

Devolatilizing extruders and processes are known in the art and typically involve a twin-screw extruder equipped with multiple venting sections for solvent removal. The devolatilizing extruders most often contain screws with numerous types of elements adapted for such operations as simple feeding, devolatilization and liquid seal formation. These elements include forward-flighted screw elements designed for simple transport, and reverse-flighted screw and cylindrical elements to provide intensive mixing and/or create a seal. Particularly useful are counterrotating, non-intermeshing twin screw extruders, in which one screw is usually longer than the other to facilitate efficient flow through the die of the material being extruded. Such equipment is available from various manufacturers including Welding Engineers, Inc.

In a preferred embodiment, isolation comprises pre-concentration (partial evaporation of the solvent) and devolatilization extrusion steps. During pre-concentration, the major part of the solvent is removed by evaporation, preferably at an elevated temperature, for example in the range from about 150 to about 300° C., more preferably in the range from about 180 to about 260° C., and/or elevated pressure, for example in the range from about 2 to about 75 bar, more preferably in the range from about 5 to about 50 bar. Pre-concentration is followed by devolatilization extrusion to remove the residual solvent.

As an alternative to completely isolating the poly(arylene ether)-poly(siloxane) copolymer, one or more resins may be added to the devolatilized poly(arylene ether)-poly (siloxane) copolymer in the same process. The one or more resins may be fed into the devolatilizing extruder although additional extruders may also be used. Possible variations include melt feeding the one or more resins into the devolatilizing extruder or melt feeding the poly(arylene ether)-poly (siloxane) copolymer from the devolatilizing extruder into a second compounding extruder as well as combinations of these. The one or more resins can vary widely and can also include additives common to such compatibilized blends. Such additives include impact modifiers, lubricants, flame retardants, pigments, colorants, fillers, reinforcing agents, carbon fibers and fibrils, and the like.

In a particularly preferred embodiment, functionalization, copolymer synthesis, and isolation (steps 2,3, and 4) are a continuous process effected by solution functionalization, solution co-polymerization at low temperature followed by solution polymerization at high temperature and pressure, and finally melt copolymerization. Preferably, melt polymerization and isolation of the copolymer are performed by devolatilization. The sequence of low and high temperature solution co-polymerization, followed by devolatilization extrusion serves to increase the degree of copolymer formation.

Accordingly, after poly(arylene ether) synthesis, a solution of the poly(arylene ether) (1) is treated so as to result in solution functionalized poly(arylene ether (2). Solvents for effective functionalization are known, for example inert solvents such as chloroform, toluene, and chlorobenzene. Toluene is preferred.

Solution copolymer formation is next initiated. Solution copolymerization is generally effected at temperatures in the range from about 20 to about 300° C., and at pressures in the range from about 1 to about 100 bar. Reaction times vary depending on the reactants, temperature, and pressure, but are typically in the range from about 0.1 to about 50 hours.

Preferably, solution co-polymerization occurs in two steps, a first, low temperature, low pressure step, and a second, higher temperature and/or higher pressure step. The low temperature step is preferably in the range from about 20 to about 100° C., and preferably at about 60 to about 100° C. Pressure is preferably in the range from about 1 to about 1.2 bar. The second solution copolymerization is at a higher temperature and/or pressure, preferably in the range from about 150 to about 350° C., and more preferably in the range from about 200 to about 300° C. Pressure is in the range from about 2 to about 100 bar, and preferably in the range from about 10 to about 50 bar. Precise temperatures and pressures will depend at least on part on the reactants.

Solution copolymerization is then preferably followed by melt copolymerization, and finally isolation of the copolymer. Melt copolymerization and isolation are most preferably performed simultaneously by devolatilization extrusion co-polymerization. This step is preferably performed at temperatures in the range from about 150 to about 350° C., using a screw speed in the range from about 50 to about 1000 rpm and residence time in the range from about 10 seconds to about 15 minutes. A high degree of copolymer formation occurs in some instances during a single extrusion step. This indicates that the conversion to poly(arylene ether)-poly (siloxane) copolymer initiated in the solution steps can be further increased in the extrusion step.

The above-described processes are suitable for the formation of poly(arylene ether)-poly(siloxane) copolymers from poly(arylene ether)s (1) wherein X is a hydroxy, carboxy, ester, hydroxyalkyl, vinyl, amino, or allyl group, and reactive poly(siloxane)s (2) wherein Y is an epoxy, amino, hydroxy, vinyl, hydroxyalkyl, hydroxyaryl, hydroxyacyl, or allyl group.

Another embodiment comprises the copolymeric reaction product of a vinyl-modified poly(arylene ether) (2) wherein X is vinyl, with a vinyl stopped poly(siloxane) (3), wherein Y is vinyl. Since copolymerization is by a free radical mechanism, a mixture of block and graft copolymers is generally produced.

Another embodiment comprises the copolymeric reaction product of a hydroxyalkyl-modified poly(arylene ether) (2) wherein X is a hydroxyalkyl, with a hydroxyalkyl- or hydroxyaryl-stopped poly(siloxane) (3), wherein x is 1, A is an alkyl or aryl group, and Y is a hydroxy group. Copolymerization in this case occurs in the presence of a co-reactant as discussed above.

Another embodiment comprises the copolymeric reaction product of an ester-modified poly(arylene ether) (2) wherein X is a carboxy ester group, with a with a hydroxyalkyl- or hydroxyaryl-stopped poly(siloxane) (3), wherein Y is a hydroxyalkyl or hydroxy aryl group. Block copolymers result where X is an end group as shown in (2). Formation of graft copolymers occurs when X is present along the poly(arylene ether) chain.

A still further embodiment comprises poly(arylene ether)-polyorganosiloxane copolymers produced by hydrosilation of an allyl-functionalized poly(arylene ether) wherein X is allyl, with a hydride-containing poly(organosiloxane) wherein x is 0 and Y is hydrogen. Linear block copolymers are produced from poly(arylene ether)s (2) having allylic groups at the terminus of the polymer chains. For generation of linear block copolymers poly(arylene ether)s containing 1 to 2 allylic functions and polyorganosiloxanes containing 1 to 2 Si—H groups per polymer chain are preferred. Alternatively, if poly(arylene ether)-polyorganosiloxane graft copolymers are desired, poly(arylene ether)s containing grafted allylic functions are used. These materials may be prepared by known routes including metallation of a poly(arylene ether) with an organolithium (as described above by Chalk) followed by allylation of the poly(arylene ether) with an allyl halide. Such allylated poly(arylene ether)s are also described by Ishii, et al in Microelectronics Technology, Chapter 32, pg. 485–503. For the generation of crosslinked poly(arylene ether)-polyorganosiloxane at least one of a poly(arylene ether) containing greater than 2 allylic groups per molecule or polyorganosiloxane containing greater than 2 Si—H groups per molecule is used.

The block copolymers may be formulated with one or more other fillers or additives to further modify their properties. Typical examples of such additives include flame retardants, plasticizers, flow promoters, inorganic fillers, or other thermoplastic resins including poly(phenylene ether)s or siloxanes or thermosetting resins such as epoxies, polyesters, maleimides or cyanate esters.

The poly(arylene ether)-poly(siloxane) copolymers are useful as molding materials, for example as resins for electrical applications, including encapsulants or resins for printed circuit board laminates the copolymers may further be used as as treating agents for fillers such as fumed silica, quartz, particulate glass, or clays, or as sizing agents for glass, to promote compatibility between the polar surfaces of the filler, e.g., the silanol groups of glass), and the polymeric matrix. For example, fumed silica treated with poly(arylene ether)-poly(siloxane) copolymers are extremely useful for environmentally benign tire applications, as the poly(arylene ether) portion of the copolymer is compatible with the styrene-butadiene rubber portion of the tire, while the poly(siloxane) portion of the copolymer has a very high affinity to the filler.

The poly(arylene ether)-poly(siloxane) copolymers are also useful as additives to other thermoplastic or elastomeric resins. For example, linear poly(phenylene ether)-polyorganosiloxane copolymers in particular have use as impact modifiers or flame retardants for thermoplastic blends. When used as additives for poly(arylene ether) resins, the resulting blends generally have better or comparable properties, such as impact strength and/or flame retardancy and/or low smoke generation under burning.

The invention is further illustrated by the following non-limiting examples.

EXAMPLES

Functionalization of Poly(Arylene ether)s by Redistribution

In a typical procedure for the functionalization of a poly(arylene ether) by redistribution, 900 g of the poly (arylene ether) is dissolved with stirring in 4 liters of toluene at 60° C. for 2 hours. Separately, 10 mol % of a phenol, e.g., 103.5 g of 2-(4-hydroxyphenyl) ethanol (abbreviated ETOH in Table 1) is dissolved in 200 mL of methanol and added to the poly(arylene ether) solution. 0.1 wt % (based on poly (arylene ether)) of 3,3', 5,5'-tetramethyl4,4'-diphenquinone (TMDQ) is added, the reaction is continued for 1 hour, another 3 g of TMDQ is added, the reaction continued for one hour, and then another 3 g of TMDQ is added. After the last addition of TMDQ, the reaction mixture is stirred at 60° C. for additional 3 hours. Half of the mixture is then poured into 15 liters of methanol to form a precipitate and stirred for 15 minutes. The methanol phase is decanted, and another 15 liters of fresh methanol is added to the remaining precipitate. The second half of the reaction mixture is then added to the methanol mixture. The obtained slurry is stirred 30 minutes, the methanol phase is decanted, and the remaining powder washed is washed twice with 5 liters of methanol. The powder is dried under vacuum at 80° C. overnight. Functionality content and molecular weight are determined by $^1$H-NMR and GPC (chloroform using polystyrene standards).

Other phenols used for poly(arylene ether) functionalization via redistribution reaction include 4,4'-bis(4-hydroxyphenyl) valeric acid (VAL) and (4-hydroxyphenyl) acetic acid (ACET) (which provide a carboxylic acid functional groups), and 1-allyl-6-methylphenol, eugenol and 2-allylphenol (VINYL) (which provide allyl functional groups). Higher or lower functionality content can be prepared by using more or less phenol derivative relative to the amount of poly(arylene ether). Table 1 summarizes the properties of functionalized poly(arylene ether)s used in the Examples below.

TABLE 1

| Sample No. | IV of PPE* | Mw/Mn of PPE | Phenol Used | Mw/Mn of Product | Funct. Type | Funct. µmol/g |
|---|---|---|---|---|---|---|
| S1 | 46 | 56100/24800 | VAL | 18300/5600 | COOH | 10 |
| S2 | 46 | 56100/24800 | EtOH | 19200/5700 | OH | 26 |
| S3 | 46 | 56100/24800 | EtOH | 18500/5300 | OH | 34 |
| S4 | 40 | 40000/20100 | ACET | 16400/2800 | COOH | 20 |
| S5 | 40 | 40000/20100 | EtOH | 15500/2500 | OH | 24 |
| S6 | 40 | 40000/20100 | ACET | 15800/2200 | COOH | 33 |
| S8 | 14 | 13400/2400 | ACET | 7800/1700 | COOH | 13 |
| S9 | 46 | 56100/24800 | VINYL | 15500/2100 | VINYL | 81 |

*IV: Intrinsic viscosity of the poly(arylene ether) (mL/g), measured in chloroform at 25° C.

Example 1A
Solution Synthesis of Poly(Arylene ether)-Poly (Epoxysiloxane) Copolymers 30 g of carboxylated poly(arylene ether) (MW=16500 g/mol, 120 µmol COOH/g poly(arylene ether) prepared as described above S1, Table 1) was dissolved in 140 mL of toluene and 3 g of the epoxidized poly(dimethylsiloxane) (5 epoxy groups per chain, two being terminal, average degree of polymerization =65) was added. The mixture was heated to 100° C. and reacted for 2 hours with stirring at 100 rpm. The toluene was removed by evaporation, the residue was dried under vacuum, and then subjected to extraction with heptane using a Soxhlet extractor for 15 hours. The extract was dried under vacuum and the poly(siloxane) content determined by FTIR. The reaction yielded 21% copolymer formation based on weight.

Example 1B
High Temperature/Pressure Solution Synthesis of Poly (Arylene ether)-Poly(Epoxysiloxane) Copolymers Immediately after reaction, part of the product of Example 2A was poured into methanol to induce precipitation. The precipitate was filtered, washed with methanol and dried under vacuum. 8 g of this material was dissolved in 40 mL of toluene in a 300-mL pressure stainless steel reactor, heated to 240° C. (10 bar pressure developed) and stirred at 50 rpm for 0.5 hour. The reaction mixture was cooled to the room temperature, the toluene was removed by evaporation, the residue was dried under vacuum, and then subjected to extraction with heptane using a Soxhlet extractor for 15 hours. The extract was dried under vacuum and the poly(siloxane) content determined by FTIR. The reaction yielded 34% copolymer formation.

Example 2A
Solution Synthesis of Poly(Arylene ether)-Poly (Aminosiloxane) Copolymers 30 g of the carboxylated poly(arylene ether) used in Example 2 was dissolved in 140 mL of toluene and 1.5 g of an α,ω-bisamino-stopped poly(dimethyl siloxane) (average degree of polymerization =10) was added. The mixture was heated to 100° C. and reacted for 2 hours with stirring at 100 rpm. The toluene was removed by evaporation, the residue was dried under vacuum, and then subjected to extraction with heptane using a Soxhlet extractor for 15 hours. The extract was dried under vacuum and the poly(siloxane) content determined by FTIR. The reaction led to 39% copolymer formation.

Example 2B
High Temperature/Pressure Solution Synthesis of Poly (Arylene ether)-Poly(aminosiloxane) Copolymers Immediately after reaction, part of the product of Example 2A was poured into methanol to induce precipitation. The precipitate was filtered, washed with methanol and dried under vacuum. 8 g of this material was dissolved in 40 mL of toluene in a 300-mL pressure stainless steel reactor, heated to 240° C. (10 bar pressure developed) and stirred at 50 rpm for 0.5 hour. The reaction mixture was cooled to the room temperature, the toluene was removed by evaporation, the residue was dried under vacuum, and then subjected to extraction with heptane using a Soxhlet extractor for 15 hours. The extract was dried under vacuum and the poly(siloxane) content determined by FTIR. The reaction yielded 80% copolymer formation.

Example 2C
Melt Extrusion Synthesis of Poly(arylene ether)-Poly (aminosiloxane) Copolymers 300 g of the poly(arylene ether)-poly(siloxane) copolymers prepared as described in the examples 2A and 2B were extruded in a PRISM extruder under the conditions described in Table 2. The extruded products were dried under vacuum and extracted using a Soxhlet extractor with heptane for 15 hours. The extract was dried under vacuum. Poly(siloxane) content was determined by FTIR. The reaction led to 88% copolymer formation.

TABLE 2

| Mini-extruder Prism 16TSE. | | | |
|---|---|---|---|
| Screw type | Twin self-cleaning | Nose Temp.: | 290° C. |
| Screw length | 25D | Zone 1: | 285° C. |
| Diameter | 16 mm | Zone 2: | 275° C. |
| Speed | 300 rpm | Zone 3: | 235° C. |
| Vacuum | not used | Feeder: | 130° C. |

Example 3

3 g of a poly(arylene ether) derivative containing primary amino groups (Mw=17200 g/mol as measured by GPC in chloroform using PS standards, 19 $NH_2$/g poly(arylene ether) prepared by the procedure described above) was dissolved in 14 mL of toluene and 0.15 g of the epoxidized poly(dimethylsiloxane) was added. The mixture was heated to 100° C. and allowed to react for 2 hours with stirring at 100 rpm. The toluene was removed by evaporation, the residue was dried under vacuum, and then subjected to extraction with heptane using a Soxhlet extractor for 15 hours. The extract was dried under vacuum and the poly(siloxane) content determined by FTIR. The reaction led to 9% copolymer formation.

Examples 1–3 illustrate that poly(arylene ether)-poly(siloxane) copolymer formation depends on the combination of functionalities present on each component and the reaction conditions. Conversion to the copolymer can be continuously increased by sequential reaction under three sets of reaction conditions: first, solution reaction at 100° C. under atmospheric pressure; second, solution reaction at higher temperature (240° C.) and higher pressure; and third, melt extrusion. Where all three steps are performed immediately subsequent to each other, no precipitation after the second step is necessary and the reaction solution is transferred directly to a devolatilization extruder. Higher conversion may be obtained in a devolatilization extruder compared to a classical polymer extruder, due to better mass transfer in the presence of a solvent.

Example 4
Melt Synthesis of Poly(arylene ether)-Poly(siloxane) Copolymers by Reactive Extrusion In order to determine the effectiveness of single-step formation of poly(arylene ether)-poly(siloxane) copolymers by reactive extrusion, and to compare the reactivity of different grades of functionalized poly(arylene ether) and reactive silicones, dry components in the amounts indicated in Table 3 were dry blended and extruded under the conditions shown in Table 2. Co-reactants comprising 2,5-dimethyl-1,5-di(t-butyl)peroxide hexane (DHBP), 1,2,4,5-tetra carboxylic anhydride benzene (DIANH), and a low molecular weight epoxy (EPICOTE 828, available from Shell Chemical Co.) were used in some Examples. Results are presented in Table 3.

least readily between poly(arylene ether) derivatized with carboxyl functionalities and epoxy- functionalized poly(siloxane) (Example 4I). The extent of copolymerization between poly(arylene ether) derivatized with carboxyl functionalities and amino-functionalized poly(siloxane) (Example 4E) is intermediate. With respect to carboxyl-amino copolymerization, the extent of copolymerization is increased with increasing molecular weight\n of the poly(arylene ether) (Examples 4E, 4K and 4L). Use of an epoxy co-reactant provides greater acceleration of the reaction between poly(arylene ether) derivatized with carboxyl groups and epoxy-functionalized poly(siloxane) (Examples 4L and 4M).

Surprisingly, no copolymerization was observed between poly(arylene ether) derivatized with aliphatic hydroxyl

TABLE 3

| | PPE | | | Poly(siloxane) | | | Co-reactant | Product | | | |
|---|---|---|---|---|---|---|---|---|---|---|---|
| | | | | | | | | | Bound Poly(siloxane) | | |
| No. | X | umol/g | Mw/Mn | Type | D | Wt. % | Type/wt. % | Mw/Mn | Wt. % | % Conv. | No. |
| IV40 | OH | 53 | 40000/20100 | EPOXY | 65* | 4.7 | NO | 697--/31400 | 3.52 | 75 | 4A |
| IV40 | OH | 53 | 40000/20100 | VINYL | 120 | 4.8 | NO | 58800/24400 | 3.11 | 65 | 4B |
| IV40 | OH | 53 | 40000/20100 | VINYL | 120 | 5.1 | DHBP/2.0 | 74500/26100 | 3.85 | 75 | 4C |
| IV12 | OH | 400 | 13400/2400 | EPOXY | 65* | 4.7 | NO | 39100/15100 | 2.83 | 60 | 4D |
| S1 | COOH | 10 | 18300/5600 | NH2 | 150 | 4.8 | NO | 22300/6600 | 2.9 | 60 | 4E |
| S1 | COOH | 10 | 18300/5600 | OH | 350 | 4.4 | NO | 25000/7900 | 1.84 | 42 | 4F |
| S2 | Alk-OH | 26 | 19200/5700 | OH | 350 | 4.8 | DIANH/2.0 | 31200/12000 | 0.95 | 20 | 4G |
| S2 | Alk-OH | 26 | 19200/5700 | OH | 350 | 4.7 | EPICOTE/2.0 | 26000/6600 | 2.53 | 54 | 4H |
| S4 | COOH | 20 | 16400/2800 | EPOXY | 65* | 4.9 | NO | 23700/8700 | 4.05 | 83 | 4J |
| S5 | Alk-OH | 24 | 15500/2500 | EPOXY | 65* | 4.6 | NO | 22300/8100 | 0 | 0 | 4K |
| S6 | COOH | 33 | 15800/2200 | NH2 | 150 | 4.7 | NO | 21400/7200 | 2.95 | 63 | 4L |
| S8 | COOH | 13 | 7800/1700 | NH12 | 150 | 4.7 | EPICOTE/4.8 | 14000/7400 | 3.48 | 74 | 4N |
| S9 | VINYL | 81 | 15500/2100 | VINYL | 120 | 2 | NO | 18300/9800 | 0.78 | 46 | 4O |
| S9 | VINYL | 81 | 15500/2100 | VINYL | 120 | 2 | DMDPH/1.0 | 20700/10100 | 0.72 | 47 | 4P |

As may be seen from the data in Table 4, Examples 4A and 4D demonstrate that reaction will occur between the aromatic hydroxyl groups of poly(arylene ether) and the epoxy groups of epoxypoly(siloxane)s. These samples further indicate that phase separation phenomena may play an important role in copolymer formation, as low molecular weight poly(arylene ether) (Example 4D, IV=12), which results in lower conversion, has an almost 8 times higher phenolic end group content than high molecular weight poly(arylene ether) (Example 4A, IV=40). Higher phenolic content may lead to stronger repulsion of the low molecular weight poly(arylene ether) by the apolar poly(siloxane)s, such that reaction between the functional groups is hindered and lower copolymer formation is obtained. Similar results are obtained from Examples 4E and 4K.

Comparison of Examples 4B and 4C show that reaction of unmodified poly(arylene ether) and vinyl stopped poly(siloxane)s results in radical grafting under the extrusion conditions. The presence of peroxide accelerates the grafting reaction, as evidenced by both molecular weight increase and extractable decrease observed for Example 4C. Since the products were soluble in chloroform, higher extent of crosslinking reaction can be excluded. Use of peroxide in the copolymerization of poly(arylene ether) functionalized with vinyl groups with allyl-Poly(siloxane) did not increase reaction rate (Examples 4N and 4O).

Comparison of Examples 4E, 4F, and 4I indicate that copolymer formation occurs most readily between poly(arylene ether) derivatized with carboxyl functionalities and hydroxyl-functionalized poly(siloxane) (Example 4F), and groups and epoxy groups of poly(siloxane)s (Example 4J). Repetition of Example 4J with another grade of hydroxyalkyl functionalized poly(arylene ether) with a comparable molecular weight and functionality content yielded the same result. Furthermore, degradation of neither poly(arylene ether) nor the poly(siloxane) was observed during reactive extrusion.

A co-reactant is required for reaction between hydroxyl functionalities. The epoxy co-reactant (Example 4H) is more efficient than dianhydride co-reactant (Example 4l), although the molecular weight of the extracted product is higher in the presence of the dianhydride co-reactant. This may be due to the small size and better compatibility of the dianhydride with poly(arylene ether). Additionally (or alternatively), EPICOTE may act primarily as a chain extender for the poly(siloxane), and/or hinder the extractability of the poly(siloxane).

Example 5
Properties of poly(arylene ether)-Poly(siloxane) Copolymers

In order to compare the properties of the present copolymers with commercial grade poly(arylene ether), Example 4A, having 3.52 wt. % poly(siloxane), and Example 4C, having 3.85 wt. % poly(siloxane) were selected for further testing, based on their higher poly(siloxane content and high molecular weight. Since these samples could not be molded (due to coating of the screw and barrel of the molding machine, slipping of granulate in the kneading zone and melt in further barrels), the samples were blended with neat poly(arylene ether) (IV=0.46 mL/g). Blending of Example 4A and 4C in a ratio 1:2 yielded a composition have a total poly(siloxane) content of 1.2 wt. % (Example 5A) and 1.3 wt. % (Example 5C), respectively. Two commercial grades of poly(arylene ether) were extruded and blended for comparison. The first (PPE-1) comprised 95 wt. % poly(arylene ether), 2.5 wt % polyoctanylene, 1.5 wt. % SEBS, and 1 wt. The second (PPE-2) comprised 84.5 wt. % poly(arylene ether), 10 wt. % polystyrene, 2.5 wt. % Polyoctanelyne, 2 wt. % SEBS, and 1 wt. % polyethylene. Comparison of the tensile properties, Izod notched strength, impact strength, Vicat-B, melt viscosity (MV) and environmental stress cracking resistance (ESCR) is shown in Table 4.

TABLE 4

| Property | Sample No. | | | |
|---|---|---|---|---|
| | 5A | 5C | PPE-1 | PPE-2 |
| MV (1500 sec$^{-1}$) | 428 | 400 | 669 | 340 |
| Modulus | 2402 | 2219 | 2231 | 2438 |
| Yield stress | 73.3 | 64.4 | 67.3 | 72.2 |
| Yield strain | 5.8 | 5.4 | 5.7 | 5.4 |
| Max. stress | 73.3 | 64.4 | 67.3 | 72.2 |
| Elongation to break | 29.5 | 10.4 | 16.4 | 6.5 |
| Impact (notched, 23° C.) | 6.1 | 7.1 | 18.3 | 16.6 |
| ESCR (0.7% strain, sec) | 230 | 35 | 73 | 44 |
| Vicat-B (120° C./hour) | 209.5 | 205.4 | 207.6 | 189.9 |

As can be seen from the data of Table 4, most of the properties vary within a narrow range, the only substantial differences being in the impact properties (where poly (arylene ether)-1 and poly(arylene ether)-2 are superior), and in ESCR (where Example 5A is superior). Optimization of the present copolymers by use of additives (such as those present in poly(arylene ether)-1 and poly(arylene ether)-2), provides access to new an engineering thermoplastic copolymers having advantageous property profiles.

Example 6
Preparation of Allylated Poly(Arylene ether)

To a solution containing 200 g of poly(2,6-dimethyl-1,4-phenylene ether) (Mw=10,000; Mn=3,800, OH content=310 $\mu$mol/g) dissolved in 1 liter of toluene was added 25 mL (0.29 mol) of allyl bromide, 5 mL of a 50% NaOH solution and 3 mL of a surfactant (Adogen 464). The reaction was stirred overnight at room temperature. After this time the product was precipitated from solution by addition to methanol and the polymer was isolated by filtration. The isolated polymer was dried overnight in vacuo. Yield=91%; $^1$H—NMR (CDCl$_3$, TMS) $\delta$2.10 ppm (s, CH$_3$ from poly (arylene ether) repeat unit) $\delta$6.40 ppm (s, Ar—H from poly(arylene ether) repeat unit) $\delta$4.25 ppm (OCH$_2$CHCH$_2$, d, 2H) $\delta$5.30 ppm (OCH$_2$CHCH$_2$,H-trans to OCH$_2$,d,1H) 5.40 ppm (OCH$_2$CHCH$_2$, H cis to OCH$_2$, d,1H) 6.10 ppm (OCH$_2$CHCH$_{2,m}$, 1H); allyl content=270 $\mu$mol/g; gel permeation chromatography (CHCl$_3$, polystyrene standards) Mw=11,400; Mn=5,600.

Example 7
Preparation of Poly(arylene ether)-Poly(dimethyl)siloxane Copolymers

To a solution of toluene containing 18.72 g of the allylated poly(arylene ether) of Example 6 was added 33.32 g (3 molar equivalents based on allyl) of hydride-capped polydimethylsiloxane (DP=52; 620 ppm hydride endgroup). The solution was treated with 0.66 g of catalyst and the reaction mixture heated to reflux. After heating for 8 hours, the solution was allowed to cool and the polymer was isolated from solution by precipitation into methanol. The isolated powder was dried overnight in vacuo. Yield=95%; $^1$H—NMR (CDCl$_3$, TMS) $\delta$2.10 (s, CH$_3$ from poly(arylene ether) repeat unit) $\delta$6.41 (s, Ar—H from poly(arylene ether) repeat unit), $\delta$0.08 (s, CH$_3$ from siloxane repeat unit, s, XH) d 3.67 (OCH$_2$CH$_2$CH$_2$Si, t, 2H); Disappearance of allyl resonances in $^1$H—NMR spectra indicated complete reaction. Gel permeation chromatography (CHCl$_3$, polystyrene standards) Mw=35,400; Mn=15,300

Example 8
Synthesis of Poly(arylene ether)-Poly(dimethyl)siloxane Copolymer Blends with Poly(arylene ether)

As shown in Table 5, various blends of poly(arylene ether) and the poly(arylene ether)-poly(dimethylsiloxane) block copolymer of Example 7 were compounded in a Welding Engineers twin screw extruder at 590 ° F. The resulting extrudate was then quenched in a water bath and pelletized, and the pelletized resin was molded at 610° F. in a 32-ton Engel injection molder. The resulting molded samples were tested for flame retrace on $\frac{1}{16}^{th}$-inch samples, and N-Izod Notched impact strength in comparison with a molded sample of commercial grade of poly(arylene ether).

TABLE 5

| Sample No. | PPE | Co-polymer | Wt. % Si | UL-94 FOT (sec) | UL-94 Rating | N-Izod (ft-lbs/inch) |
|---|---|---|---|---|---|---|
| 1 | 100.0 | 0 | 0 | 57.2 | V-1 | 0.83 |
| 2 | 99.6 | 0.4 | 0.196 | 32.4 | V-0 | 0.92 |
| 3 | 99.2 | 0.8 | 0.392 | 20.5 | V-0 | 0.92 |
| 4 | 99.4 | 1.6 | 0.784 | 19.0 | V-0 | 0.85 |
| 5 | 97.8 | 3.2 | 1.568 | 26.2 | V-0 | 0.93 |
| 6 | 90.0 | 10.0 | 4.90 | 128.3 | Fail | 2.21 |

As can be seen by the above data, addition of small amounts of a poly(arylene ether)-poly(siloxane) copolymer to poly(arylene ether) reduces the total flame out times in $\frac{1}{16}$"thick UL-94 specimens by approximately half and improved the rating from UL-94 V-1 to V-0. Although addition of higher levels significantly improved the impact properties over the control poly(arylene ether) resin control, an increase in total flame out time and poorer performance in the UL-94 flame test were also observed.

While preferred embodiments have been described, the invention is not limited to those embodiments described herein.

What is claimed is:

1. A method for synthesis of poly(arylene ether)-poly (siloxane) copolymers, comprising
   (a) solution functionalization of a poly(arylene ether) having the structure (1)

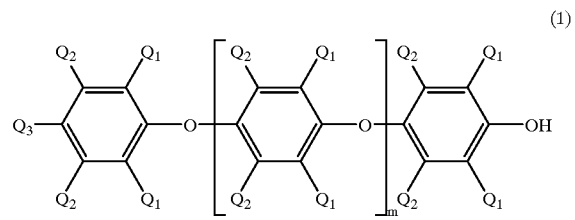

(1)

wherein each $Q_1$ is independently selected from the group consisting of halogen, a primary or secondary alkyl group having from 1 to about 7 carbon atoms, phenyl, haloalkyl, aminoalkyl, hydrocarbonoxy, and halohydrocarbonoxy wherein at least two carbon atoms separate the halogen and oxygen atoms, each $Q_2$ is independently selected from the group consisting of hydrogen, halogen, a primary or secondary alkyl group having from 1 to about 7 carbon atoms, phenyl, haloalkyl, aminoalkyl, hydrocarbonoxy, and halohydrocarbonoxy wherein at least two carbon atoms separate the halogen and oxygen atoms, $Q_3$ is a hydrogen, a hydroxyl, or a combination thereof, and m is an integer having an average value in the range from about 3 to about 300, to form functionalized poly(arylene ether) having the structure (2)

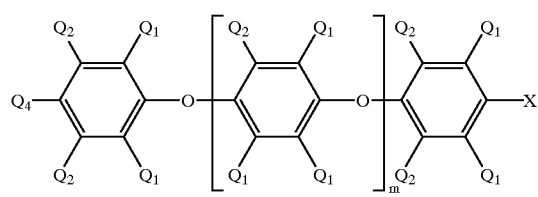

(2)

wherein $Q_1$, $Q_2$, and m are as defined above, $Q_4$ is a hydrogen, X, or a combination thereof, and X is a reactive functional group selected from the group consisting of anhydride, hydroxyl, epoxy, carboxyl, $-R^1OH$, $R^1CO_2R^2$, $-R^1CH_2=CH_2$, and vinyl, wherein $R^1$ is a primary or secondary divalent alkyl or haloalkyl group having from 1 to 20 carbons, or an aryl group and $R^2$ is a primary or secondary alkyl group having from 1 to 10 carbons; and (b) copolymerization by reaction of functionalized poly (arylene ether) (2) with a poly(organosiloxane) having structure (3):

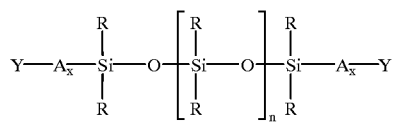

(3)

wherein each R is independently selected from the group consisting of a primary or secondary alkyl group having from one to 12 carbons, a primary or secondary haloalkyl group having from one to twelve carbons, an aryl group having from 6 to 12 carbons, an aralkyl group having from 7 to 18 carbons, and mixtures thereof; n is an integer having an average value from about 3 to about 500 inclusive; A is a substituted or unsubstituted aromatic group having from 6 to about 18 carbon atoms, or a primary or secondary divalent saturated or unsaturated alkyl group having from 1 to about 30 carbon atoms; x is zero or one; and Y is a functional group reactive with X, selected from the group consisting of $-OH$, $-CH_2=CH_2$, epoxy, amino, carboxy, $-C(O)CH_2OH$, and hydrogen, to form a poly(arylene ether)-polysiloxane copolymer, wherein solution functionalization and copolymerization are a continuous process.

2. The method of claim 1, wherein copolymerization is by solution copolymerization followed by melt copolymerization.

3. The method of claim 2, further comprising isolation of the poly(arylene ether)-poly(siloxane)copolymer.

4. The method of claim 3, wherein the melt polymerization and isolation of the copolymer are by devolatilization extrusion.

5. The method of claim 2, wherein the solution copolymerization is at a first temperature and pressure, and a second temperature and pressure, wherein the first temperature and pressure are lower than the second temperature and pressure.

6. The method of claim 5, further comprising isolation of the poly(arylene ether)-poly(siloxane)copolymer.

7. The method of claim 6, wherein the melt polymerization and isolation of the copolymer are by devolatilization extrusion.

8. The method of claim 1, wherein each $Q_1$ is methyl, each $Q_2$ is hydrogen, and each R is methyl.

9. A poly(arylene ether)-poly(siloxane) copolymer which is the reaction product of a functionalized poly(arylene ether) having the structure (2)

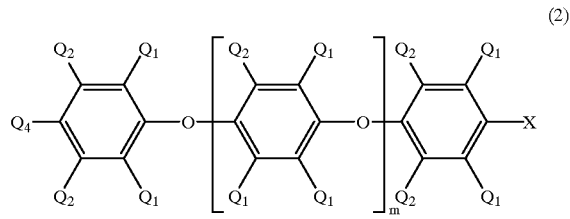

(2)

wherein each $Q_1$ is independently selected from the group consisting of halogen, a primary or secondary alkyl group having from 1 to about 7 carbon atoms, phenyl, haloalkyl, aminoalkyl, hydrocarbonoxy, and halohydrocarbonoxy wherein at least two carbon atoms separate the halogen and oxygen atoms; each $Q_2$ is independently hydrogen, halogen, a primary or secondary alkyl group having from 1 to about 7 carbon atoms, phenyl, haloalkyl, aminoalkyl, hydrocarbonoxy, or halohydrocarbonoxy wherein at least two carbon atoms separate the halogen and oxygen atoms; m is an integer having an average value in the range from about 3 to about 300; $Q_4$ is a hydrogen, X, or a combination thereof; and X is a reactive functional group selected from the group consisting of $-R^1OH$, $R^1CO_2R^2$, $-R^1CH_2=CH_2$, and vinyl, wherein $R^1$ is a primary or secondary divalent alkyl or haloalkyl group having from 1 to 20 carbons or an aryl group, and $R^2$ is a primary or secondary alkyl group having from 1 to 10 carbons with a poly(organosiloxane) having structure (3):

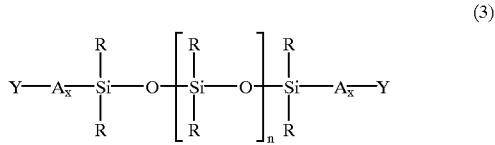

(3)

wherein each R is independently selected from the group consisting of a primary or secondary alkyl group having from one to 12 carbons, a primary or secondary haloalkyl group having from one to twelve carbons, an aryl group having from 6 to 12 carbons, an aralkyl group having from 7 to 18 carbons, and mixtures thereof; n is an integer having an average value from about 3 to about 500 inclusive; A is a substituted or unsubstituted aromatic group having from 6 to about 18 carbon atoms, or a primary or secondary divalent saturated or unsaturated alkyl group having from 1 to about 30 carbon atoms; x is zero or one; and Y is $-OH$ or $-C(O)CH_2OH$, when X is $-R^1OH$ or $R^1CO_2R^2$; or Y is vinyl or allyl when X is vinyl or allyl.

10. The copolymer of claim 1, wherein each $Q_1$ is methyl and each $Q_2$ is hydrogen.

11. A method for the manufacture of poly(arylene ether)-poly(siloxane) copolymers, comprising solution copolymerization of a poly(arylene ether) having at least two functional groups selected from the group consisting of anhydride, hydroxyl, epoxy, carboxyl, —$R^1OH$, $R^1CO_2R^2$, —$R^1CH_2$=$CH_2$, allyl, and vinyl, wherein $R^1$ is a primary or secondary divalent alkyl or haloalkyl group having from 1 to about 20 carbons, or an aryl group and $R^2$ is a primary or secondary alkyl group having from 1 to about 10 carbons, with a poly(siloxane) having at least two functional groups selected from the group consisting of —OH, —$CH_2$=$CH_2$, epoxy, amino, carboxy, —$C(O)CH_2OH$, vinyl, allyl, and hydrogen, wherein the poly(siloxane) functional groups are reactive with the functional groups of the poly(arylene ether); and melt copolymerization of the poly(arylene ether and the poly(siloxane).

12. The method of claim 11, further comprising isolation of the poly(arylene ether)-poly(siloxane)copolymer.

13. The method of claim 12, wherein the melt polymerization and isolation of the copolymer are by devolatilization extrusion.

14. The method of claim 11, wherein the solution copolymerization is at a first temperature and pressure, and a second temperature and pressure, wherein the first temperature and pressure are lower than the second temperature and pressure.

15. The method of claim 14, further comprising isolation of the poly(arylene ether)-poly(siloxane)copolymer.

16. The method of claim 15, wherein the melt polymerization and isolation of the copolymer are by devolatilization extrusion.

17. The method of claim 1, wherein the poly(arylene ether is poly(2,6-dimethyl-1,4-phenylene ether).

18. A method for synthesis of poly(arylene ether)poly(siloxane) copolymers, comprising (a) solution functionalization of a poly(arylene ether) having the structure (5)

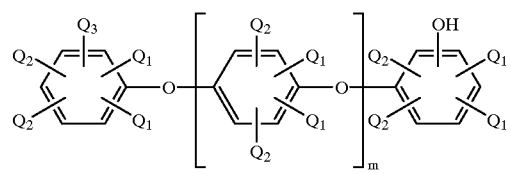

(5)

wherein each $Q_1$ is independently selected from the group consisting of halogen, a primary or secondary alkyl group having from 1 to about 7 carbon atoms, phenyl, haloalkyl, aminoalkyl, hydrocarbonoxy, and halohydrocarbonoxy wherein at least two carbon atoms separate the halogen and oxygen atoms, each $Q_2$ is independently selected from the group consisting of hydrogen, halogen, a primary or secondary alkyl group having from 1 to about 7 carbon atoms, phenyl, haloalkyl, aminoalkyl, hydrocarbonoxy, or halohydrocarbonoxy wherein at least two carbon atoms separate the halogen and oxygen atoms, $Q_3$ is a hydrogen, a hydroxyl, and a combination thereof, and m is an integer having an average value in the range from about 3 to about 300, to form functionalized poly(arylene ether) having the structure (4)

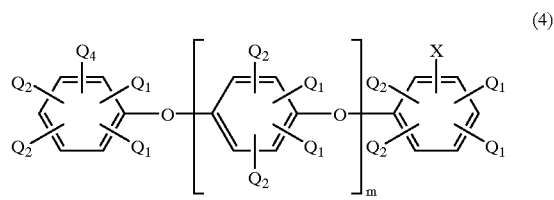

(4)

wherein $Q_1$, $Q_2$, and m are as defined above, $Q_4$ is a hydrogen, X, or a combination thereof, and X is a reactive functional group selected from the group consisting of anhydride, hydroxyl, epoxy, carboxyl, —$R^1OH$, $R^1CO_2R^2$, $R^1CH_2$=$CH_2$, and vinyl, wherein $R^1$ is a primary or secondary divalent alkyl or haloalkyl group having from 1 to 20 carbons, or an aryl group and $R^2$ is a primary or secondary alkyl group having from 1 to 10 carbons; and (b) copolmerization by reaction of functionalized poly(arylene ether) (2) with a poly(organosiloxane) having structure (3):

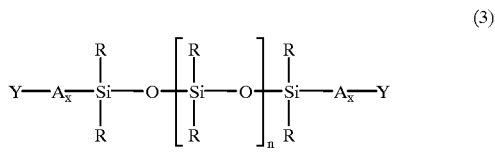

(3)

wherein each R is independently selected from the group consisting of a primary or secondary alkyl group having from one to 12 carbons, a primary or secondary haloalkyl group having from one to twelve carbons, an aryl group having from 6 to 12 carbons, an aralkyl group having from 7 to 18 carbons, and mixtures thereof; n is an integer having an average value from about 3 to about 500 inclusive; A is a substituted or unsubstituted aromatic group having from 6 to about 18 carbon atoms, or a primary or secondary divalent saturated or unsaturated alkyl group having from 1 to about 30 carbon atoms; x is zero or one; and Y is a functional group reactive with X, selected from the group consisting of —OH, —$CH_2$=$CH_2$, epoxy, amino, carboxy, —$C(O)CH_2OH$, and hydrogen, to form a poly(arylene ether)-poly(siloxane) copolymer, wherein solution functionalization and copolymerization are a continuous process.

19. The method of claim 18, wherein copolymerization is by solution copolymerization followed by melt copolymerization.

20. The method of claim 19, further comprising isolation of the poly(arylene ether)-poly(siloxane)copolymer.

21. The method of claim 20, wherein the melt polymerization and isolation of the copolymer are by devolatilization extrusion.

22. The method of claim 19, wherein the solution copolymerization is at a first, low temperature and pressure, and a second, higher temperature and pressure.

23. The method of claim 22, further comprising isolation of the poly(arylene ether)-poly(siloxane)copolymer.

24. The method of claim 23, wherein the melt polymerization and isolation of the copolymer are by devolatilization extrusion.

25. The method of claim 18, wherein each $Q_1$ is methyl, each $Q_2$ is hydrogen, and each R is methyl.

* * * * *